United States Patent [19]

Geller et al.

[11] Patent Number: 5,726,383

[45] Date of Patent: Mar. 10, 1998

[54] TELEPHONE RADIATION SHIELD

[76] Inventors: Uri Geller, Sonning Court, Thames Street, Sonning-on-Thames, Berkshire RG4 OUR, England; Meir Gitlis, Bnei Atarot 60991, Israel

[21] Appl. No.: 638,682

[22] Filed: Apr. 29, 1996

[51] Int. Cl.[6] ............................................. H05K 9/00
[52] U.S. Cl. ...................... 174/35 R; 455/300; 455/347; 29/525.01
[58] Field of Search ..................... 174/35 R; 361/814, 361/753, 799, 800, 816, 818; 307/89, 91; 379/445, 450, 451, 454, 455, 428, 433, 437, 440; 455/89, 90, 117, 128, 271, 278.1, 296, 300, 301, 347, 348; 29/525.01

[56] References Cited

U.S. PATENT DOCUMENTS

| | | | |
|---|---|---|---|
| 4,904,549 | 2/1990 | Goodwin et al. | 429/97 |
| 5,335,366 | 8/1994 | Daniels | 455/89 |
| 5,336,896 | 8/1994 | Katz | 250/515.1 |
| 5,444,866 | 8/1995 | Cykiert | 455/89 |
| 5,596,487 | 1/1997 | Castaneda et al. | 361/814 |
| 5,613,221 | 3/1997 | Hunt | 455/89 |

FOREIGN PATENT DOCUMENTS

95/31048  11/1995  WIPO.

Primary Examiner—Kristine L. Kincaid
Assistant Examiner—Hung V. Ngo

[57] ABSTRACT

A radiation shield for use with a mobile hand-held communication device, the communication device including a listening element and a stowable and deployable talking element, the radiation shield including a first shield portion which at least partially covers the talking element, a second shield portion which at least partially covers the listening element, a fastener which fastens the first and the second shield portions together, the first and the second shield portions and the talking element being in a stowed orientation when the first and the second shield portions are fastened together by the fastener, and a tensioning device operatively attached to at least one of the first and the second shield portions, wherein the tensioning device, upon opening of the fastener, applies a force to at least one of the first and the second shield portions which moves at least one of the first and the second shield portions into a deployed orientation.

8 Claims, 3 Drawing Sheets

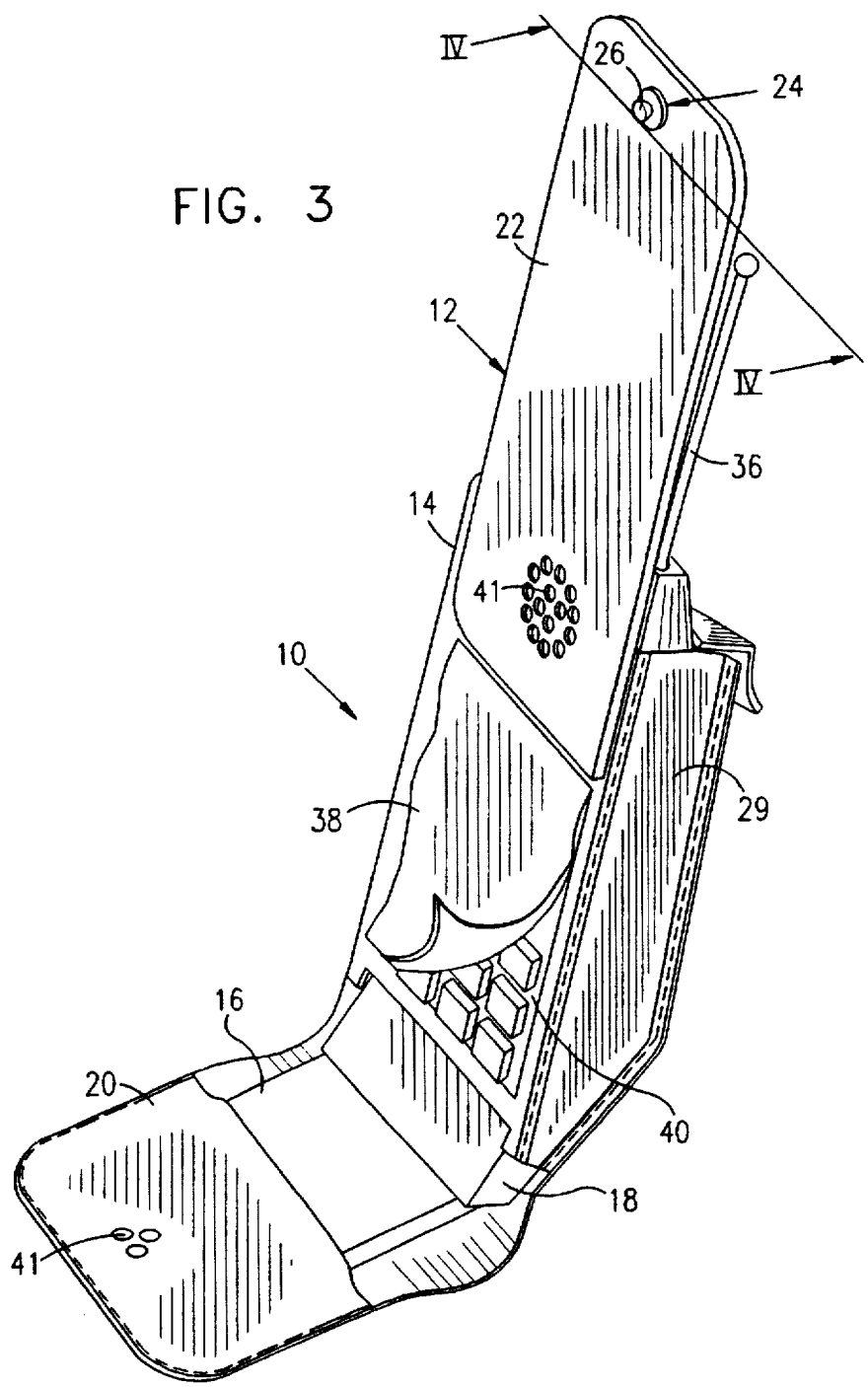
FIG. 3
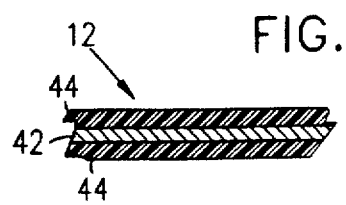
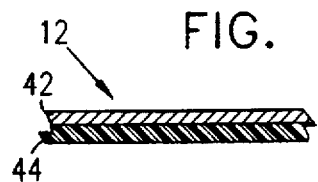

TELEPHONE RADIATION SHIELD

FIELD OF THE INVENTION

The present invention relates to radiation shields generally, and particularly to radiation shields for mobile hand-held communication apparatus.

BACKGROUND OF THE INVENTION

Mobile hand-held communication apparatus, such as portable telephones, walkie-talkies, and cellular telephones are well known in the art. Recently much attention has been drawn to radiation emitted from such apparatus, particularly cellular telephones, which may be injurious to a human user. For example, it has been widely reported that a large percentage of electromagnetic energy associated with the transmission of messages with a cellular telephone is absorbed by the brain and hand of the user. Clearly, some sort of radiation shielding is highly desirable for preventing damage to the user.

There are radiation shields for cellular telephones in the art. U.S. Pat. No. 5,335,366 to Daniels, describes a radiation shield which has a closed-curve cross sectional shape which wraps completely around the antenna of the cellular telephone. Published PCT application PCT/US95/05866, also filed by Daniels, differs from the '366 patent in that the radiation shield may only partially wrap around the antenna. In addition, a battery, comprising a shielding material, is provided for shielding an electronic circuit component.

U.S. Pat. No. 5,336,896 to Katz, describes a protective shielding device which includes an antenna which can be swiveled and distanced from the user's head.

SUMMARY OF THE INVENTION

The present invention seeks to provide an improved radiation shield for use with a mobile hand-held communication device. The shield has portions which are attached to each other by a fastener. By opening the fastener, the radiation shield automatically deploys talking and/or listening elements of the communication device, thereby preparing the communication device for ready use.

There is thus provided in accordance with a preferred embodiment of the present invention, a radiation shield for use with a mobile hand-held communication device, the communication device including a listening element and a stowable and deployable talking element, the radiation shield including a first shield portion which at least partially covers the talking element, a second shield portion which at least partially covers the listening element, a fastener which fastens the first and the second shield portions together, the first and the second shield portions and the talking element being in a stowed orientation when the first and the second shield portions are fastened together by the fastener, and a tensioning device operatively attached to at least one of the first and the second shield portions, wherein the tensioning device, upon opening of the fastener, applies a force to at least one of the first and the second shield portions which moves at least one of the first and the second shield portions into a deployed orientation.

Preferably the second shield portion, when in a deployed orientation, at least partially covers an antenna of the communication device.

In accordance with a preferred embodiment of the present invention, the first and the second shield portions include at least one metalized layer sandwiched between at least two dielectric layers. Alternatively, the first and the second shield portions include at least one metalized layer attached to at least one dielectric layer.

Additionally in accordance with a preferred embodiment of the present invention, the radiation shield includes a third shield portion which selectively at least partially covers a dialing portion of the communication device.

Further in accordance with a preferred embodiment of the present invention, a radiation shielding jacket is provided which at least partially covers a body portion of the communication device.

There is also provided in accordance with a preferred embodiment of the present invention, a mobile hand-held communication device including a stowable and deployable talking element, a listening element, a radiation shield including a first shield portion which at least partially covers the talking element, and a second shield portion which at least partially covers the listening element, a fastener which fastens the first and the second shield portions together, the first and the second shield portions and the talking element being in a stowed orientation when the first and the second shield portions are fastened together by the fastener, and a tensioning device operatively attached to at least one of the first and the second shield portions, wherein the tensioning device, upon opening of the fastener, applies a force to at least one of the first and the second shield portions which moves at least one of the first and the second shield portions into a deployed orientation.

There is also provided in accordance with a preferred embodiment of the present invention, a method for shielding a user from radiation emanating from a mobile hand-held communication device, the communication device including a listening element and a stowable and deployable talking element, the method including the steps of at least partially covering the talking element with a first shield portion, at least partially covering the listening element with a second shield portion, providing a fastener which fastens the first and the second shield portions together, the first and the second shield portions and the talking element being in a stowed orientation when the first and the second shield portions are fastened together by the fastener, and providing a tensioning device operatively attached to at least one of the first and the second shield portions, wherein the tensioning device, upon opening of the fastener, applies a force to at least one of the first and the second shield portions which moves at least one of the first and the second shield portions into a deployed orientation.

BRIEF DESCRIPTION OF THE DRAWINGS

The present invention will be understood and appreciated more fully from the following detailed description, taken in conjunction with the drawings in which:

FIG. 3 is a simplified pictorial illustration of the communication device and the radiation shield in a fully deployed orientation; and FIGS. 4A and 4B are simplified sectional illustrations of a portion of the radiation shield of FIGS. 1–3, constructed and operative in accordance with two alternative embodiments of the present invention, taken along lines IV—IV in FIG. 3.

DETAILED DESCRIPTION OF A PREFERRED EMBODIMENT

Figure 1:
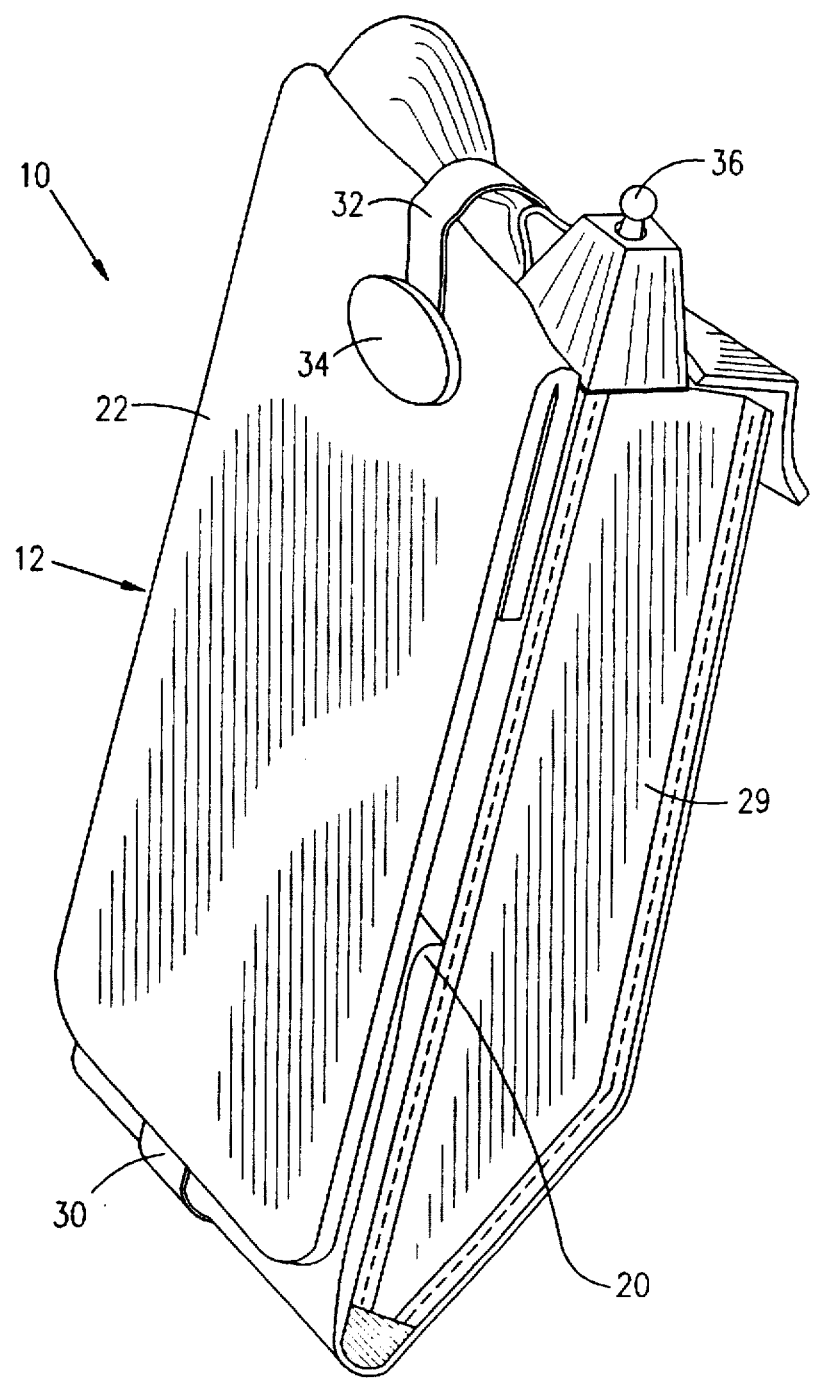
FIG. 1 is a simplified pictorial illustration of a communication device and a radiation shield, constructed and operative in accordance with a preferred embodiment of the present invention, the radiation shield and talking and listening elements of the communication device being in a stowed orientation.
Figure 2:
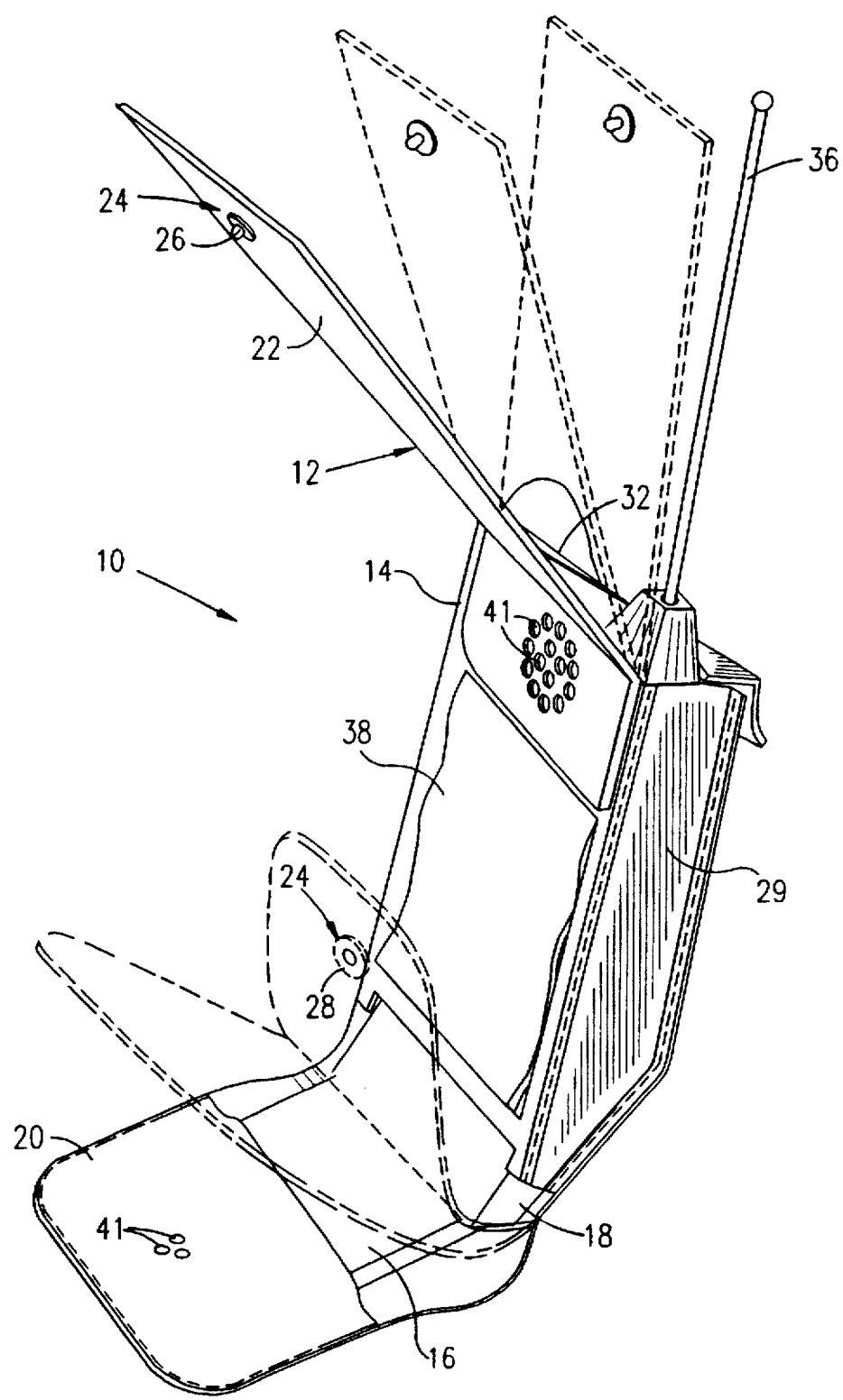
FIG. 2 is a simplified pictorial illustration of the communication device and the radiation shield in a partially deployed orientation.

Reference is now made to FIGS. 1–3 which illustrate a communication device 10 and a radiation shield 12, constructed and operative in accordance with a preferred embodiment of the present invention.

Communication device 10, typically a cellular telephone, preferably includes a listening element 14 and a stowable and deployable talking element 16, both seen in FIGS. 2 and 3. Talking element 16 is preferably hinged to a body portion 18 of communication device 10.

Radiation shield 12 preferably includes a first shield portion 20 which at least partially covers talking element 16, and a second shield portion 22 which at least partially covers listening element 14. First shield portion 20 is preferably formed as a pouch in which is disposed talking element 16.

Referring particularly to FIGS. 2 and 3, it is seen that radiation shield 12 preferably further includes a fastener 24 which fastens first 20 and second 22 shield portions together. For example, fastener 24 may include a male snap 26 attached to second shield portion 22 and a female snap 28 attached to first shield portion 20. It is appreciated that any other suitable fastener may be used, such as a clasp or Velcro brand fastener.

In FIG. 1, first 20 and second 22 shield portions and talking element 16 are in a stowed orientation and first 20 and second 22 shield portions are fastened together by fastener 24. Preferably a radiation shielding jacket 29 is provided which at least partially covers body portion 18. Radiation shielding jacket 29 is preferably integrally formed with first 20 and second 22 shield portions, such as by sewing or stitching thereto.

In accordance with a preferred embodiment of the present invention, a tensioning device is operatively attached to at least one of first 20 and second 22 shield portions. As seen in FIGS. 1 and 2, a first tensioning device 30 is attached to first shield portion 20 and a second tensioning device 32 is attached to second shield portion 22. Each of tensioning devices 30 and 32 are preferably an elastic band which is fixed to and tensioned against an outer rear surface of radiation shielding jacket 29. Alternatively, tensioning devices 30 and 32 may be any resilient material or spring built into first 20 and second 22 shield portions respectively. Second tensioning device 32 may be provided with a decorative clasp 34, if desired.

As described above, FIG. 1 illustrates first 20 and second 22 shield portions and talking element 16 in a stowed orientation, with first 20 and second 22 shield portions being fastened together by fastener 24.

In FIG. 2, it is seen that upon opening fastener 24, tensioning devices 30 and 32 apply a force to first 20 and second 22 shield portions, respectively, thereby moving first 20 and second 22 shield portions into a deployed orientation. Communication device 10 is shown in a fully deployed orientation in FIG. 3.

In FIG. 3, it is seen that second shield portion 22, when in a deployed orientation, at least partially covers an antenna 36 of communication device 10.

In accordance with a preferred embodiment of the present invention, and as seen in FIGS. 2 and 3, radiation shield 12 further includes a third shield portion 38 which selectively at least partially covers a dialing portion 40 of communication device 10.

Preferably second shield portion 22 is provided with a plurality of holes 41 which enhance communication with listening element 14. First shield portion 20 may also be provided with holes 41, if desired, for enhancing communication with talking element 16.

Reference is now made to FIG. 4A, which illustrates a preferred construction of radiation shield 12. Preferably radiation shield 12 includes at least one metalized layer 42 sandwiched between at least two dielectric layers 44. Metalized layer 42 may help to further attenuate radiation energy emitted by communication device 10 (not shown in FIG. 4A). Dielectric layers 44 are preferably constructed of any suitably pliant dielectric material, such as leather or plastic.

Reference is now made to FIG. 4B, which illustrates another preferred construction of radiation shield 12. In this embodiment, radiation shield 12 includes at least one metalized layer 42 attached to at least one dielectric layer 44.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention is defined only by the claims which follow:

We claim:

1. A radiation shield for use with a mobile hand-held communication device, the communication device including a listening element and a stowable and deployable talking element, said radiation shield comprising:

a first shield portion which at least partially covers said talking element;

a second shield portion which at least partially covers said listening element;

a fastener which fastens said first and said second shield portions together, said first and said second shield portions and said talking element being in a stowed orientation when said first and said second shield portions are fastened together by said fastener; and a tensioning device operatively attached to at least one of said first and said second shield portions, wherein said tensioning device, upon opening of said fastener, applies a force to at least one of said first and said second shield portions which moves said at least one of said first and said second shield portions into a deployed orientation.

2. A radiation shield according to claim 1 and wherein said second shield portion, when in said deployed orientation, at least partially covers an antenna of said communication device.

3. A radiation shield according to claim 1 and wherein said first and said second shield portions comprise at least one metalized layer sandwiched between at least two dielectric layers.

4. A radiation shield according to claim 1 and wherein said first and said second shield portions comprise at least one metalized layer attached to at least one dielectric layer.

5. A radiation shield according to claim 1 and further comprising a third shield portion which selectively at least partially covers a dialing portion of said communication device.

6. A radiation shield according to claim 1 and further comprising a radiation shielding jacket which at least partially covers a body portion of said communication device.

7. A mobile hand-held communication device comprising:

a stowable and deployable talking element;

a listening element;

a radiation shield comprising a first shield portion which at least partially covers said talking element, and a second shield portion which at least partially covers said listening element;

a fastener which fastens said first and said second shield portions together, said first and said second shield portions and said talking element being in a stowed orientation when said first and said second shield portions are fastened together by said fastener; and a tensioning device operatively attached to at least one of said first and said second shield portions, wherein said tensioning device, upon opening of said fastener, applies a force to said at least one of said first and said second shield portions which moves at least one of said first and said second shield portions into a deployed orientation.

8. A method for shielding a user from radiation emanating from a mobile hand-held communication device, the communication device including a listening element and a stowable and deployable talking element, said method comprising the steps of:

at least partially covering said talking element with a first shield portion;

at least partially covering said listening element with a second shield portion;

providing a fastener which fastens said first and said second shield portions together, said first and said second shield portions and said talking element being in a stowed orientation when said first and said second shield portions are fastened together by said fastener; and providing a tensioning device operatively attached to at least one of said first and said second shield portions, wherein said tensioning device, upon opening of said fastener, applies a force to at least one of said first and said second shield portions which moves said at least one of said first and said second shield portions into a deployed orientation.

* * * * *